United States Patent Office 2,920,997
Patented Jan. 12, 1960

2,920,997

FUNGICIDAL COMPOSITION OF A HYDANTOIN SELECTED FROM THE GROUP CONSISTING OF 5,5 POLYMETHYLENE AND 5,5 DIARYL, AND 5,5 ARYL, ALKY HYDANTOIN

Calvin N. Wolf, Forest Hills, N.Y., and Waldo B. Ligett, Pontiac, Mich., assignors, by mesne assignments, to Pittsburgh Coke and Chemical Company, a corporation of Pennsylvania No Drawing. Application February 14, 1955
Serial No. 488,134

11 Claims. (Cl. 167—33)

This invention relates to a new class of fungicides and more particularly to new and potent fungicides comprising 1,3-dihalohydantoins.

An object of this invention is to provide a new class of fungicidal compositions. A further object is to provide a new means for combating fungi.

A new class of fungicidal compositions has been discovered which comprises hydantoins of the formula

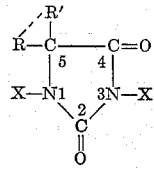

where X is halogen of atomic weight 35 to 80, that is, chlorine or bromine, and R and R′ are selected from the class consisting of hydrocarbon radicals, including alkyl, alkaryl, and aryl, and halogenated hydrocarbon radicals, including halogenated alkyl and aryl radicals. In general we prefer that each of R and R′ contains one to about ten carbon atoms. It has been found that compositions comprising a conditioning agent as defined below and such hydantoins are potent fungicides and that they provide an effective means for combating fungi when applied to the habitat or loci of the fungi. The 5 position can be substituted either with two separate hydrocarbon or halogenated hydrocarbon radicals, such as dimethyl- or methyl-p-bromophenyl, or it can be substituted with and form a part of, a single cycloaliphatic group, as in 1,3-dichloro-5-pentamethylene spiro hydantoin and 1,3-dibromo-5-tetramethylene spiro hydantoin. In such cases the cycloaliphatic group can contain three to about twenty-one carbon atoms, as above. However in the spiro hydantoin series we prefer that R and R′ vary from one carbon atom each to about four carbon atoms. The first class of fungicides, which is preferred in this invention, has the formula

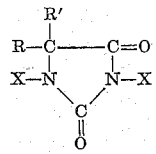

where R and R′ can be the same or different and are as defined above, and the second class has the formula

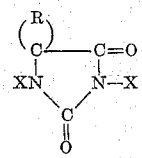

The hydantoins of this invention can be prepared conveniently by reaction of the parent hydantoin, wherein the nitrogen members of the ring are substituted with hydrogen, with chlorine, or bromine, as is illustrated in the following examples.

Example I

*1,3-dichloro-5-methyl-5-octenyl hydantoin.*—In a reactor fitted with mechanical agitator, temperature measuring device, and a gas-inlet line was placed a solution of 37.4 parts of sodium carbonate monohydrate in 150 parts of water. To this solution was added 45 parts of 5-methyl-5-octenyl hydantoin. The mixture was stirred and heated to 30–40° C. while chlorine gas was passed slowly into the mixture. When the mixture was no longer alkaline to pH test paper, the reaction was stopped. Upon standing, an opaque, white semi-solid separated as a layer. The water was decanted and the semi-solid material collected and dried in a vacuum desiccator over phorus pentoxide. The dried material was 1,3-dichloro-5-methyl-5-octenyl hydantoin, a brittle, white solid weighing 39.8 parts (68 percent), M.P. 50–57° C.

Example II

*1,3-dichloro-5,5-di-(4 - chlorophenyl) hydantoin.*—Fifteen parts of 5,5-di-(4-chlorophenyl) hydantoin were dissolved in 150 parts (added in small portions) of 1.83 N sodium hydroxide and chlorine gas passed into the solution. A white precipitate began forming immediately, and the temperature rose quickly to 40°. The mixture was cooled to 35° and maintained between 30–40° for ten minutes, after which time the temperature of the solution began to drop and was no longer basic to litmus paper. Chlorine was passed into the mixture for five minutes more, after which time the mixture was filtered and dried overnight in vacuo. There was obtained 18.7 parts, M.P. 230–234°, of 1,3-dichloro-5,5-di-(4-chlorophenyl hydantoin, which was then heated in 200 ml. of boiling glacial acetic acid for three to four minutes, cooled, and filtered. The final yield was 16 parts (87.6 percent), M.P. 231–234°.

Example III

*1,3-dichloro-5-ethyl-5-phenyl hydantoin.*—In a reactor similar to that of Example I was placed a suspension of 41 parts of 5-ethyl-5-phenyl hydantoin and 32 parts of sodium carbonate in 400 parts of water. The mixture was warmed to 30–40° C. and, while stirring, chlorine gas was slowly passed into the suspension until it was approximately neutral. The product was then removed by filtration. Yield, 48 parts (88 percent of the theoretical), M.P. 136–138° C. *Analysis.*—Calculated: 26.0 percent chlorine. Found: 26.0 percent chlorine.

Example IV

*1,3-dichloro-5,5-pentamethylene spiro hydantoin.*—In a similar reactor was placed a mixture of 34 parts of 5,5-pentamethylene spiro hydantoin and 32 parts of sodium carbonate in 375 parts of water. The mixture was warmed to 30–40° C. and, while stirring, chlorine gas was slowly passed into the suspension until it was approximately neutral. The product was removed by filtration, washed, and dried. Yield, 25 parts (53 percent), M.P. 124–126° C. (lit. value, 126–127° C.).

Example V

*5,5-dimethyl-1,3-dichlorohydantoin.*—In a similar reactor was placed a solution of 25.6 parts of 5,5-dimethylhydantoin and 16.8 parts of sodium bicarbonate in 200 parts of water. The solution was warmed to 30–40° C., and chlorine gas slowly passed into the mixture until it was approximately neutral. The product was then filtered, washed with water, and dried. Yield, 16 parts (40 percent of the thoretical), M.P. 143–145° C. (lit. value 144–145° C.).

In similar manner, the following hydantoins are prepared: 1,3-dichloro-5-methyl-5-isobutylhydantoin, M.P. 76–80° C.; 1,3-dichloro-5-methyl-5-nonylhydantoin, waxy; 1,3-dichloro-5,5-diphenylhydantoin, M.P. 162–165° C.; 1,3-dichloro-5-methyl-5-ethylhydantoin, M.P. 61–63° C.; 1,3-dichloro-5-methyl-5-(p-chlorophenyl)hydantoin, M.P. 126–128° C.; 1,3-dichloro-5-methyl-5-phenylhydantoin, M.P. 123–125° C.; 1,3-dichloro-5,5-diisopropylhydantoin, M.P. 119–121° C.; 1,3-dichloro-5,5-dibenzylhydantoin, M.P. 168–170° C.; 1,3-dichloro-5-butyl-5-phenylhydantoin, M.P. 143–145° C.; 1,3-dichloro-5-methyl-(p-bromophenyl)hydantoin, M.P. 116–118° C.; 1,3-dibromo-5,5-dimethylhydantoin, M.P. 186–190° C.; and 1,3-dibromo-5-methyl-5-(β-naphthyl)hydantoin, M.P. 175–185° C.

For maximum effectiveness the new compounds of the present invention are admixed in fungicidally effective amount with a conditioning agent of the type commonly referred to as a pest control adjuvant or modifier. In order to provide formulations particularly adapted for ready and efficient application to pests using conventional equipment, such formulations comprise those of both the liquid and solid types as well as the "Aerosol" type formulations. In the pure state our compounds may be too effective or too potent in some applications to have practical utility as pesticides. For example, in order to protect most effectively a surface such as paint, wood, concrete, etc., it is preferred to apply our materials in intimate contact but thoroughly dispersed on the surface. Likewise, in treating more or less porous material, such as cloth, felted textiles, and woven fibers, it is important that our materials be interspersed between the fine structure of such materials and be in intimate contact therewith. Therefore, in order to benefit from our discovery that the defined materials are effective pesticides, we incorporate therewith a relatively inert surface-active agent or adjuvant as a dispersing medium. Furthermore, such adjuvants have the effect of requiring only minute quantities of the above defined compounds in some formulations to obtain effective protection. A further advantage of so extending these materials is to permit field application by methods readily employed and still obtain effectively complete coverage of the material being protected.

The formulations of this invention, therefore, comprise the hereinabove defined pesticidally active ingredients and a suitable material as an adjuvant of conditioning agent therefor. It is not intended that this invention be limited to any specific proportions of active ingredient and adjuvant. The important feature of the invention is to provide an adjuvant such that upon the prepartion of a formulation of such concentration as appropriate for application, the adjuvant will be present to provide the proper type of contact with the material being protected. Thus, in one embodiment the adjuvant can comprise a surface-active agent such as a detergent, a soap, or other wetting agent. Such a formulation then comprises the active ingredient in combination with a minor proportion of the surface-active agent or adjuvant. Such a formulation is of practical merit because of its concentrated form and ease of transportation, storage, and the like. Such a formulation lends itself directly to further dilution with the carrier without resorting to complicated mixing and blending procedures. Thus, such a formulation can be further diluted with a solid carrier of the dust type by a simple mixing operation. Likewise, such a formulation can be directly suspended in water or can be further diluted with an oil which upon mixing with water thereby forms an oil-in-water emulsion containing the active ingredients. One further example of the utility of such a formulation comprises the preparation of further dilution with a solid carrier of a wettable powder which upon admixture with water prior to application forms a dispersion of the active ingredients and the solid carrier in water.

It is also intended that the term "conditioning agent" include solid carriers of the type of talc, pyrophyllite, Attaclay, kieselguhr, chalk, diatomaceous earth, and the like; and various mineral powders, such as calcium carbonate and the like, which act as a dispersant, as a carrier, and in some instances perform the function of a surface-active agent.

One method of applying these pesticides is in the form of a water suspension. However, to obtain a pesticidally active aqueous suspension, we employ a surface-active agent in sufficient amount to disperse and suspend the pesticidal agents. Examples of such surface-active agents which can be employed in forming dispersions include salts of the alkyl and alkylaryl sulfonates, such as Du Pont MP–189 and Nacconol–NR, a sodium salt; alkyl sulfates, such as Dreft; alkylamide sulfonates, including fatty methyl taurides such as Igepon–T; the alkylaryl polyether alcohols, such as Triton X–100; the fatty acid esters of polyhydric alcohols, such as Span; the ethylene oxide addition products of such esters, as for example Tween, a hexitol product; and the addition products of long-chain mercaptans and ethylene oxide, such as Sharples' Non-Ionic–218. Still other surface-active agents can be employed, the above merely showing a representative list of the more common materials.

In the examples which follow, all parts are parts by weight.

Example VI

A formulation of 1,3-dichloro-5-methyl-5-ethylhydantoin is prepared by adding with vigorous agitation 10 parts of this material to 1000 parts of water containing one part of Tween–80. This concentrated dispersion is further diluted 1000 times by the addition of water to obtain a formulation of suitable concentration for application. Thus, the resulting dispersion contains 10 p.p.m. of our pesticide in the water dispersion.

The solubility of the active ingredients of this invention in organic solvents, furthermore, is such that it can be applied advantageously in the form of solution in this type of solvent, and for certain uses this method of application is preferred. For example, in treating cloth, leather, or other fibrous articles, it is preferred to apply the pesticides dissolved in a volatile solvent. After use the volatile solvent evaporates, leaving the pesticidal agents impregnated throughout the surface of the article and in the dispersed form which has been found to be most advantageous. Likewise, in applying the pesticides to smooth surfaces, as for example, in treating wood or other surfaces, a solution may be the most practical method for applying a protective film by brushing, spraying, or dipping. The choice of an appropriate solvent is determined largely by the concentration of active ingredient which it is desired to employ, by the volatility required in a solvent, the spreading or flow characteristics thereof, and by the nature of the material being treated. Among the many organic solvents which can be employed as the carrier for the pesticides, we use hydrocarbons, such as benzene, xylene, or toluene; ketones, such as acetone, methylethyl ketone, and cyclohexanone; chlorinated solvents, such as carbon tetrachloride, trichloro- and perchloroethylene; esters, such as ethyl, butyl, and amyl acetates; and alcohols, such as ethanol, isopropanol, and amyl alcohols. Other solvents which are employed are the Carbitols and Cellosolves, the former comprising in general the monoalkyl ethers of diethylene glycol, and the latter, the monoalkyl ethers of ethylene glycol. In addition, combinations of these various typical solvents can be employed whereby special volatility and viscosity characteristics can be imparted to the formulations.

Example VII

A solution consisting of 5 parts of 1,3-dichloro-5-methyl-5-isobutylhydantoin in 250 parts of cyclohexanone is prepared by stirring the two constituents for a period of 2 minutes at a temperature of about 25° C. This concentrated solution, suitable for storage or transportation, is further diluted with 99,750 parts of kerosene to form a final dilution of 50 p.p.m. suitable for application.

A preferred formulation of the active ingredient pesticides of this invention comprises a wettable powder. In preparing wettable powders several formulation procedures are possible. Thus, it is one intention of this invention to provide compositions comprising the active ingredients defined herein in combination with a minor amount of a surface-active agent. Such surface-active agent can be chosen, for example, from among the following: alkyl and alkaryl sulfonates, such as Du Pont MP–189 and Nacconol-NR; alkyl sulfates, such as Dreft; alkylamide sulfonates, such as Igepon-T; the alkylaryl polyether alcohols, such as Triton X–100; the fatty acid esters of polyhydric alcohols, such as Span; the ethylene oxide addition products of such esters, as for example Tween; and the addition products of long-chain mercaptans and ethylene oxide, such as Sharples' Non-Ionic-218. Still other surface-active agents can be employed, the above merely showing a representative list of the more common materials. Many of these materials will dissolve in our new compounds, while others form suspensions. Such formulations can be readily admixed with a dust carrier. Formulations thus formed then comprise the active ingredients of this invention, a surface-active agent, and the inert carrier. Among the inert carriers which can be employed in thus preparing wettable powders are, for example, soybean flour, tobacco flour, walnut shell flour, wood flour, sulfur, tripolite, diatomite, calcium lime, magnesium lime, calcite, dolomite, gypsum, mica, talc, pyrophyllite, montmorillonite, kaolinite, attapulgite, apatite, and pumice. In preparing such concentrated wettable powders it is preferred to employ between about 0.1 and 5 percent of the surface-active agent based upon the amount of active ingredient, and up to 85 percent of the inert carrier based upon the total amount of the formulation. Such formulations provide the advantage of permitting storage and transportation of the pesticides and permit further dilution by simple admixture with water at the time of application. Thus, within the scope of this invention is also contemplated finished formulations for direct application comprising the pesticides as defined herein, surface-active agents as illustrated above, and inert solid carriers as likewise illustrated above, all suspended in water. Such finished formulations, depending upon the application in mind, can include between about 0.1 to 10,000 p.p.m. of active ingredient. A preferred range for agricultural application is between 0.1 and 2,000 p.p.m. Typical formulations of such wettable powders of this invention are illustrated in the following examples, wherein the active ingredients of this invention are employed as the pesticides.

*Example VIII*

A mixture of 100 parts of 1,3-dichloro-pentamethylenehydantoin, 1000 parts of Attaclay, and 0.1 part of Nacconol is intimately mixed in an L-shaped blender. The 10 percent wettable powder thus prepared produces a satisfactory water suspension when 11 parts are stirred into 10,000 parts of water to produce a suspension containing 100 p.p.m. active ingredient.

In addition to the above described methods of wet application of the active ingredients of this invention, compositions can be prepared in which the materials are extended in talc, clay, or other solid diluents. Such carriers perform the conditioning agent function as contact agents. Further specific examples of such typical inert solid carriers which can be employed as diluents in the dust formulations include fuller's earth, pyrophyllite, Attaclay, and the Filtrols.

*Example IX*

A dust formulation of the pesticide is prepared as follows: One part of 1,3-dichloro-5,5-diphenylhydantoin is placed in a ball mill with 100 parts of fuller's earth. This mixture is milled for a period of one hour and screened to collect a fraction passing a 100-mesh sieve. This 1 percent by weight formulation can be applied directly or further diluted. A further dilution is made by repeating the above procedure with an additional 9,900 parts of fuller's earth.

For certain applications it is preferred to employ the pesticides in the form of oil-in-water emulsions. Thus, a concentrate of the pesticidal agent is prepared in a water-insoluble solvent, and this solution is then dispersed or emulsified in water containing a surface-active agent. Typical examples of such solvents include hydrocarbons, such as kerosene, benzene, or naphtha; higher alcohols, such as butanol, oleyl alcohol, or ethers and esters thereof; and chlorinated solvents, such as perchloroethylene and trichloroethylene.

*Example X*

An oil-in-water emulsion is prepared by dissolving 10 parts of 1,3-dichloro-5-methyl-5-phenylhydantoin in 1000 parts of kerosene. This solution is dispersed with vigorous agitation in 99,000 parts of water containing 1 part of Triton X–100 to provide a dispersion containing 10 p.p.m. of active agent.

In addition, we have found that we can incorporate an adherent or sticking agent, such as vegetable oils, naturally occurring gums, and other adhesives, in our active ingredient formulations. Likewise, we can employ humectants in our formulations. Furthermore, these formulations can be employed in admixture with other pesticidal materials or other biocides, such as insecticides, larvicides, bactericides, vermicides, miticides, or with other materials which it is desired to apply along with our pesticides.

Our compounds also find effective use when formulated in "Aerosol" type formulations; that is, when mixed with a liquid of low boiling point that changes to a gas when released from a confined space. Examples of this type diluent are fluorinated hydrocarbons such as tetrafluoromethane and hexafluoroethane; mixed halogenated compounds containing fluorine and chlorine, such as difluorodichloromethane, pentafluorochloroethane; or ethylene substituted with both these halogens. Compounds containing fluorine and bromine are also applicable, as, for example, trifluorobromomethane. Other materials such as carbon dioxide, sulfur dioxide, hydrogen sulfide, and ammonia can be used, and of these carbon dioxide is preferred. One method of preparing such "Aerosol" formulations comprises introducing our new compounds into a pressure cylinder and later introducing the liquefied diluent under pressure, followed by mixing the cylinder to obtain uniform solution. If desired, smaller containers can then be filled from the cylinder in which the formulation is made up. In many cases it is desirable to add a second solvent to the low boiling material of the type described above, so as to more readily dissolve our compounds. Examples of such cosolvents are benzene, acetone, carbon tetrachloride, butyl acetate, Cellosolve, and the like.

*Example XI*

Into a cylinder rated at 500 p.s.i. working pressure is introduced 10 parts of 1,3-dichloro-5-methyl-5-β-naphthylhydantoin. The cylinder is then made pressure-tight except for one opening, through which is introduced a mixture of 50 parts acetone and 50 parts dichlorodifluoromethane from a container at 2000 p.s.i. The cylinder into which the ingredients are introduced is then sealed off and inverted to give a uniform "Aerosol" solution of our active materials in the mixture of cosolvents.

The fungicidal effectiveness of our compounds can be demonstrated by the following tests.

*Slide germination test.*—By the slide germination test the concentration of the chemical required to inhibit germination of spores from 7- to 10-day-old cultures of *Alternaria oleracea* and *Sclerotinia fructicola* is determined. Concentrations of test chemicals used in the primary screen are 1000, 100, 10, and 1.0 p.p.m. The specified concentrations of test chemical are prepared in aqueous suspensions by a series of test tube dilutions. Following the initial dilutions, four volumes of test suspension are diluted with one volume of spore stimulant and spore suspension. The spore stimulant is added to insure a high and relatively stable percentage of germination in the checks. Drops of the test suspension mixture, and an untreated control are pipetted onto glass slides. The glass slides are placed in moist chambers for 20 hours incubation at 22° C. Germination counts are made by counting 100 potentially viable spores, those spores that would germinate under the normal conditions of the control. The percent germination is expressed by the following equation: observed percent germination $\times 100 \div$ percent germination in the control. Test compounds are given letter ratings which corresponds to the concentration that inhibits germination of half of the spores ($ED_{50}$): AA=0.1 to 1.0 p.p.m.; A=1.0 to 10 p.p.m.; B=10 to 100 p.p.m.; C=100 to 1000 p.p.m.; and D=>1000 p.p.m. The glass slide germination test by the test tube dilution method is adapted from a procedure recommended by the American Phytopathological Society's committee on standardization of fungicidal tests (Phytopathology 37, 354–356 (1947)).

*Tomato foliage disease test.*—The tomato foliage disease test measures the percent control of early blight fungus, *Alternaria solani*, and late blight fungus, *Phytophthora infestans*. In the primary screen the chemicals are evaluated at concentrations of 2000 and 400 p.p.m. Tomato plants are sprayed with the test formulation, allowed to dry, and along with untreated controls are sprayed with a spore suspension of conidia of *Alternaria solani* or sporangia of *Phytophthora infestans*. The plants are held in a saturated atmosphere for 24 hours at 70° F. for early blight and 60° F. for late blight to permit spore germination and infection before removal to the greenhouse. After 2 to 4 days, lesion counts are made on the three uppermost fully expanded leaves. Reference materials screened are Captan, Phygon, Nabam, Manzate, and Parzate. This test method is a modification of that described by McCallan and Wellman (contrib. Boyce-Thompson, 13 (3): 93–134, July-September, 1943).

In such tests our compounds gave the following results:

| 1,3-Dichlorohydantoin | Slide Germination | | Tomato Foliage Disease—conc., p.p.m. for $ED_{95}$ | |
|---|---|---|---|---|
| | A.o. | S.f. | Early Blight | Late Blight |
| 5-methyl-5-ethyl- | AA | AA | | |
| 5-methyl-5-isobutyl- | AA | AA | | |
| pentamethylene- | AA | AA | | |
| 5,5-diisopropyl- | A | A | | |
| 5-methyl-5-nonyl- | | | 100 | 80 |
| | | | 300 | |
| 5,5-diphenyl- | AA | AA | 180 | 50 |
| | | | 200 | 70 |
| 5,5-dibenzyl- | A | A | | 50 |
| | | | | 55 |
| 5,5-di-(p-chlorophenyl)- | | | 500 | 300 |
| 5-methyl-5-phenyl- | AA | AA | | |
| 5-methyl-5-(p-chlorophenyl)- | A | AA | | |
| 5-ethyl-5-phenyl- | AA | AA | 105 | 25 |
| 5-butyl-5-phenyl- | AA | AA | | 60 |
| 5-methyl-5-β-naphthyl- | AA | AA | 250 | 85 |
| 1,3-dibromo-5,5-dimethylhydantoin | A | A | | |

We claim:
1. A fungicidal composition consisting essentially of a hydantoin selected from the group consisting of

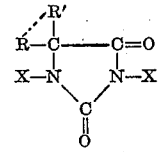

and

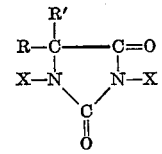

where X is selected from the group consisting of chlorine and bromine and R and R' collectively are selected from the group consisting of trimethylene and tetramethylene hydrocarbon radicals and when R and R' are separated they are selected from the group consisting of phenyl, naphthyl, halophenyl and lower alkyl with the proviso that at least one of R and R' in such case is selected from the group consisting of phenyl, naphthyl and halophenyl, in combination with a relatively inert surface active agent as an adjuvant therefor, said hydantoin being present in a fungicidally effective amount.

2. A method of combatting fungi comprising treating the habitat of the fungi with a fungicidally effective amount of a hydantoin selected from the group consisting of

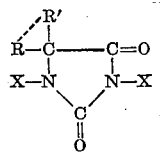

and

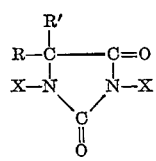

where X is selected from the group consisting of chlorine and bromine and R and R' collectively are selected from the group consisting of trimethylene and tetramethylene hydrocarbon radicals and when R and R' are separated they are selected from the group consisting of phenyl, naphthyl, halophenyl and lower alkyl with the proviso that at least one of R and R' in such case is selected from the group consisting of phenyl, naphthyl and halophenyl, in combination with a relatively inert surface active agent as an adjuvant therefor.

3. A fungicidal wettable powder composition consisting essentially of a hydantoin selected from the group consisting of

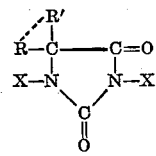

and

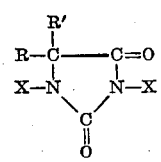

where X is selected from the group consisting of chlorine and bromine and R and R' collectively are selected from the group consisting of trimethylene and tetramethylene hydrocarbon radicals and when R and R' are separated they are selected from the group consisting of phenyl, naphthyl, halophenyl and lower alkyl with the proviso that at least one of R and R' in such case is selected from the group consisting of phenyl, naphthyl and halophenyl, an inert dust carrier and a surface active agent.

4. A composition according to claim 3 wherein said dust carrier is present in an amount up to 85 weight percent of said composition and said surface active agent is present in amount between about 0.1 to 5 weight percent of said hydantoin.

5. An oil and water fungicidal emulsion consisting essentially of a hydantoin selected from the group consisting of

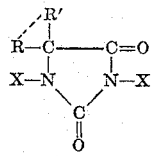

and

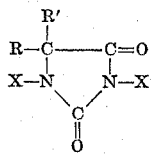

where X is selected from the group consisting of chlorine and bromine and R and R' collectively are selected from the group consisting of trimethylene and tetramethylene hydrocarbon radicals and when R and R' are separated they are selected from the group consisting of phenyl, naphthyl, halophenyl and lower alkyl with the proviso that at least one of R and R' in such case is selected from the group consisting of phenyl, naphthyl and halophenyl, in combination with a hydrocarbon oil, water and a surface active agent.

6. The method of protecting a solid subject to attack by fungi comprising coating the solid with a fungicidal amount of a hydantoin selected from the group consisting of

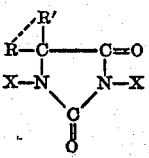

and

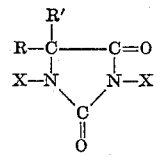

where X is selected from the group consisting of chlorine and bromine and R and R' collectively are selected from the group consisting of trimethylene and tetramethylene hydrocarbon radicals and when R and R' are separated they are selected from the group consisting of phenyl, naphthyl, halophenyl and lower alkyl with the proviso that at least one of R and R' in such case is selected from the group consisting of phenyl, naphthyl and halophenyl, in combination with a relatively inert surface active agent as an adjuvant therefor.

7. The composition of claim 1 wherein the hydantoin is 1,3-dichloro-5,5-diphenylhydantoin.

8. The method of claim 2 wherein the hydantoin is 1,3-dichloro-5,5-diphenylhydantoin.

9. The composition of claim 3 wherein the hydantoin is 1,3-dichloro-5,5-diphenylhydantoin.

10. The composition of claim 5 wherein the hydantoin is 1,3-dichloro-5,5-diphenylhydantoin.

11. The method of claim 6 wherein the hydantoin is 1,3-dichloro-5,5-diphenylhydantoin.

References Cited in the file of this patent
UNITED STATES PATENTS

| | | |
|---|---|---|
| 2,130,805 | Levine | Sept. 20, 1938 |
| 2,422,255 | Peters | June 17, 1947 |
| 2,463,541 | Houk | Mar. 8, 1949 |
| 2,789,078 | Trusler | Apr. 16, 1957 |
| 2,863,800 | Gottfried | Dec. 9, 1958 |

OTHER REFERENCES

Chem. Absts., vol. 4, part 3 (1910), p. 2820, "Action of Hypochlorus Acid and of Sodium Hypochlorite on Hydantoin and Acetylenediureins."

Frobisher: Fundamentals of Microbiology, 5th ed., May 1954, p. 3.